United States Patent

Audretsch, Jr. et al.

[15] 3,697,697

[45] Oct. 10, 1972

[54] COMMUNICATION BY SMOOTH HIGH ORDER COMPOSITES OF TRIGONOMETRIC PRODUCT FUNCTIONS

[72] Inventors: Leo M. Audretsch, Jr.; Matthew Elsner, both of Poughkeepsie, N.Y.

[73] Assignee: International Business Machines Corporation, Armonk, N.Y.

[22] Filed: Dec. 28, 1970

[21] Appl. No.: 101,656

[52] U.S. Cl. ............................................ 179/15 BC
[51] Int. Cl. ............................................ H04j 1/08
[58] Field of Search ................................ 179/15 BC

[56] References Cited

UNITED STATES PATENTS

| | | | |
|---|---|---|---|
| 3,036,157 | 5/1962 | Franco | 179/15 BC |
| 3,450,840 | 6/1969 | Vogt | 179/15 BC |

*Primary Examiner*—Kathleen H. Claffy
*Assistant Examiner*—David L. Stewart
*Attorney*—Hanifin and Jancin and Robert Lieber

[57] ABSTRACT

Member functions of certain disjoint sets of harmonically related trigonometric product functions (the term "disjoint" is used herein to describe sets which have no common member functions and relatively distinct class properties K) are combined for transmission by simultaneously selecting plural subsets of a first one of the sets, in fundamental half-periods, and superposing the members of each subset by linear addition to form subset composites. These are individually multiplied ("up-converted") by members of other sets and superposed in groups. Such cascaded multiplications and superpositions are continued convergently to provide at one central terminal a comprehensive high order composite transmission waveform which has smooth outline and contains, in a highly distinguishable form, all of the binary intelligence utilized in the initial selections of subsets of the first set. At receiving apparatus the composite transmission waveform is decomposed (down-converted) in divergently cascaded stages of multiplications by locally synthesized functions. Plural sets of higher order product waveforms, issuing from the last stages of such multiplication in parallel, are separately integrated over fundamental half-period intervals. The integrand functions correspond to distinct sums of products of pairs of high order trigonometric product functions having identical class and order. The terms of any sum all have distinct binary coefficients. The product functions form an orthogonal set with associated order and class properties respectively relating to sums and maxima of respective order and class properties of the disjoint sets containing the transmission components. Each integrand sum representation contains a unique term in which the paired product functions are identical and all other terms have unmatched functions. The function in the matching term is different for each integrand. Hence with appropriate timing of integration sampling and resetting functions a unique set of binary state pulse functions, which correspond to the binary coefficients of the matching terms of respective integrands, is sampled at outputs of respective integration stages. Normally these pulse functions correspond identically to the binary selection pulses utilized in the pre-transmission subset selections.

9 Claims, 12 Drawing Figures

INVENTORS
LEO M. AUDRETSCH, JR.
MATTHEW ELSNER

BY Robert Lieber

ATTORNEY

OUTPUT OF 132 (FIG. 2)

OUTPUT OF 136 (FIG. 2)

INTEGRAND CHANNEL b0*

INTEGRAND CHANNEL b5*

COMMUNICATION BY SMOOTH HIGH ORDER COMPOSITES OF TRIGONOMETRIC PRODUCT FUNCTIONS

BACKGROUND OF THE INVENTION

1. Field of the Invention

The invention pertains to communication systems employing high order composites of harmonically related trigonometric functions as transmission waveforms.

2. Description of the Prior Art

Ballard (U.S. Pat. No. 3,204,035) and Harmuth (U.S. Pat. No. 3,470,324) have shown that complex transmission waveforms with distinguishable components are obtained by selecting and convergently superposing and multiplying together pulse signal functions which are all members of one orthogonal set. On the receiving end the transmission composite is processed through a divergent network of cascaded multiplication elements fed by locally synthesized pulse functions which are members of the same set as the transmission components. At the final stages parallel integrating elements are operated to extract binary functions corresponding to the selection functions employed in the transmitter. Advantages of such systems, for instance economies which can be realized in component function synthesizing circuitry as a result of the muliplicative conversion arrangement in the transmitter, are often offset by the bandwidth inefficiency associated with the handling of the pulse discontinuities in the component and composite pulse functions utilized for transmission. Pulse discontinuities in the component functions can often be compounded in magnitude in the process of superposition and multiplication, thereby imposing burdensome bandwidth requirements upon the transmission channel and the transmitting and receiving circuits.

Filipowsky (U.S. Pat. No. 3,377,625) has disclosed apparatus for communication based upon a single stage of selection and superposition of certain smooth functions; in particular certain products of harmonically related trigonometric functions. The complex transmission waveforms characteristically have smooth outline and efficient transmission properties. However, the single stage of superposition may be restrictive since a distinct product function must be synthesized for each channel of binary selection. Even then it may not be possible to effectively incorporate large numbers of binary selection conditions into each period of composite transmission.

We have found that a distinct improvement in component function synthesis and transmission efficiency relative to Filipowsky can be achieved by applying a converging plural stage process of selection, grouped superposition and multiplication to certain sets of trigonometric product functions in constructing transmission composites. In general the functions utilized presently as conversion multipliers are not orthogonal to the digitally selected functions (as distinct from the exclusive use of orthogonal multipliers in Harmuth and Ballard supra) and in fact the digitally selected functions and the multiplier functions are members of relatively disjunct sets characterized herein by the term disjoint.

SUMMARY OF THE INVENTION

As one obstacle to full exploitation of the benefits of the transmission principles disclosed in the above Filipowsky patent may be the expense and difficulty of generating and efficiently utilizing orthogonally related trigonometric product functions for simultaneous transmission of large numbers of units of binary information, this invention includes among its objects the construction of:

a. systems for more efficiently utilizing trigonometric product functions to form complex highly distinguishable transmissions which are capable of carrying multiple units of binary information in each fundamental (indivisible) period of transmission.

b. systems as stated in (a) above in which said complex transmissions have smooth outline for efficient communication.

c. systems as stated in (a) characterized by higher concentration of binary information units in the available communication channel and/or more uniform and efficient distribution of frequency spectra in the transmitted composite waveforms.

d. "*n*-ary" communication systems as contemplated by Filipowsky which can carry a large number m of bits of binary information in an indivisible interval of one composite wave constructed from fewer than m trigonometric product functions.

e. systems for efficiently constructing smooth digital communication waveforms, containing multiple superposed elements representing information bits, by combinational manipulation of disjoint sets of trigonometric product functions defined by:

$f_{p,K,q}(t)=A\sin(s_1X+N_1)\sin(2s_2X+N_2)\ldots\sin(Ks_KX+N_K)$ where $p,K$, and $q$ are integers denoting respective order, class and rank properties of individual functions, as defined in the above Filipowsky patent; all functions in each of said sets having identical values of $p$ and $K$, said disjoint sets having different $K$ values;

$A$ is *a* constant for each function;

$s_n(n=1,2,\ldots,K)=1$ or 0 (each $n$)

$N_n(n=1,2,\ldots,K)=\pi/2$ or 0 (each $n$)

$X=w_0t=2\pi f_0t$ ($f_0$=fundamental frequency harmonically related to the frequency of every factor of every function.

We have found that the above objects are satisfied by a system in which member functions $f_{p1,K1,qi}$ of a first set of $i$ functions are selected in multiple parallel subsets in accordance with multiple sets of i parallel binary input signals $[(b_0,b_1,\ldots,b_{i-1}),(b_i,b_{i+1},\ldots,b_{2i-1}),\ldots]$ changing at discrete intervals $nT_0$; $T_0=\frac{1}{4}f_0(n=1,3,5,\ldots)$. The selected functions in each subset are superposed by linear addition to form thereby multiple composite functions associated with the respective sets of binary selecting signals. These composite functions are multiplied individually by predetermined functions $f_{p2,K2,qj}(K_2\neq K_1)$ of a relatively disjoint second set of $j$ functions and the new products are combined by linear addition in predetermined subgroups to produce a lesser number of higher order composite functions each associated with plural binary selection sets and a respective multiplier function of the second set. These higher order composites are multiplied individually by predetermined functions $f_{p3,K3,qk}(K_3\neq K_2\neq K_1)$ of a third set of k functions having disjoint relation to the other sets and result functions are combined in smaller subgroups to form higher order composites each associated with several of the previously formed composites. This "up-conversion" process of alternate superposition of composites and multiplication of new composites by functions of a disjoint set is continued convergently to form one comprehensive composite which is a function of all previous composites. This last composite is transmitted and decomposed ("down-converted") at the receiving end into plural sets of parallel binary output signals (i signals per set) corresponding uniquely on a one-to-one basis to the binary input selection functions applied to the first disjoint set at the transmitting apparatus.

Advantages of such a system are that the transmitted composite is capable of carrying a large amount of superposed intelligence, although it contains a fairly uniform distribution of component frequencies for all binary input selection conditions and the system can be designed to form transmission composites which will have uniform or noise-like spectral density over a large portion of the bandwidth of the communication channel. Communications theory has established that an efficient transmission system should use composite signals having the last-mentioned spectral density property.

Other objects, advantages and features of our invention will be apparent from the following description and claims illustrated by accompanying drawings.

INTRODUCTION

All elements of the present system are well known and have been extensively disclosed in the literature of the prior art. To a great extent the elements of this system are identical to elements of the various systems described in the above-referenced U.S. patent granted Apr. 9, 1968, to R. F. Filipowsky, U.S. Pat. No. 3,377,625. The disclosure of the said Filipowsky patent is deemed incorporated herein by this reference, and to the extent that elements of timing, synchronization, and/or product function synthesis in the present system are indicated below to be identical to elements of the Filipowsky disclosure details of such will be found in the latter disclosure.

Trigonometric product functions utilized in the present system are defined generally by:

(1) $f_{p,K,q}(t)=A\sin(s_1X+N_2)\ldots\sin(Ks_KX+N_K)$ where: $X=W_0t=2\pi f_0t$ ($f_0$=fundamental frequency); $p$ designates the function order (number of non-trivial factors in the product); $K$ designates the function class (highest harmonic of $f_0$ in the product);

$q$ designates the function rank in the set of all functions having the same order and class (established in accordance with the permutative listing principles set forth in column 4, line 55 to column 6, line 2 in the Filipowsky patent disclosure incorporated by reference above);

$s_n$ ($n=1,2,\ldots,K$)=0 or 1 (each $n$);

$N_n$($n=1,2,\ldots,K$)=0 or $\pi/2$ (each $n$); and $A$ is a constant for each function.

Sets of such trigonometric product functions, for purposes of the present description, are termed disjoint when they have no member functions in common and relatively distinct class properties. The system next described makes combinational use of such disjoint sets, the member functions of which are all harmonically related, mutually orthogonal and appropriately phase-synchronized, to construct transmission waveforms of a high order of complexity which are capable of carrying relatively large numbers of binary bits of information in superposed elements over intervals corresponding to half-periods of the fundamental frequency. Present transmission waveforms are distinguished further by a relatively high degree of smoothness of form and uniformly distributed spectral density associated with efficient communication.

PREFERRED EMBODIMENT

Figure 1:
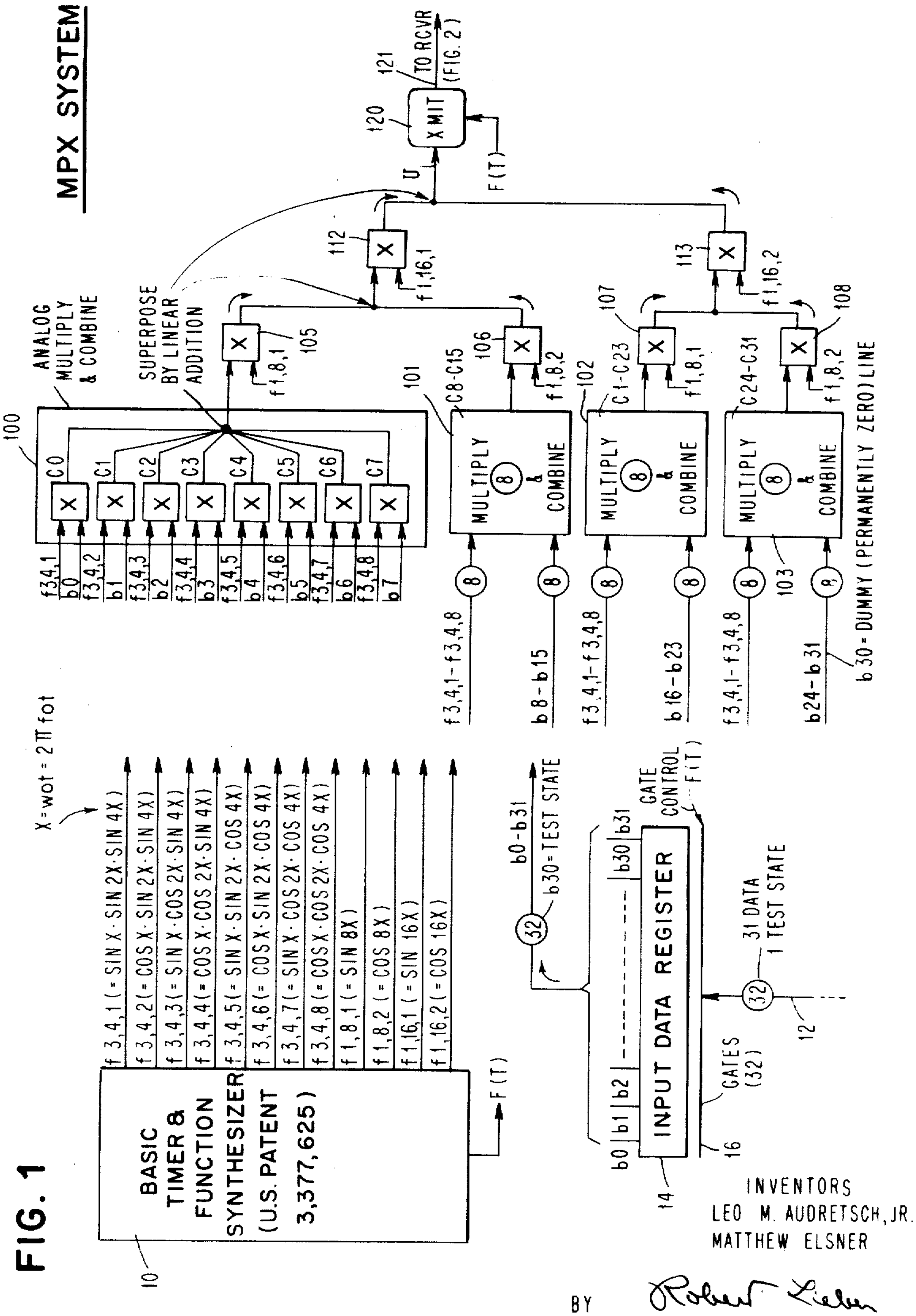
FIGS. 1 and 2 are schematics which respectively illustrate a transmitter (up-converter) and receiver (down-converter) in accordance with the invention for carrying up to 31 parallel binary information channels (selection conditions) in superposed elements of one complex wave, the latter formed from sums and products of only ten primitive trigonometric functions: sinX, cosX, sin2X, cos2X, sin4X, cos4X, sin8X, cos8X, sin16X, cos16X; where $X=w_o t=2\pi f_0 t$.
Figures 2, 3:
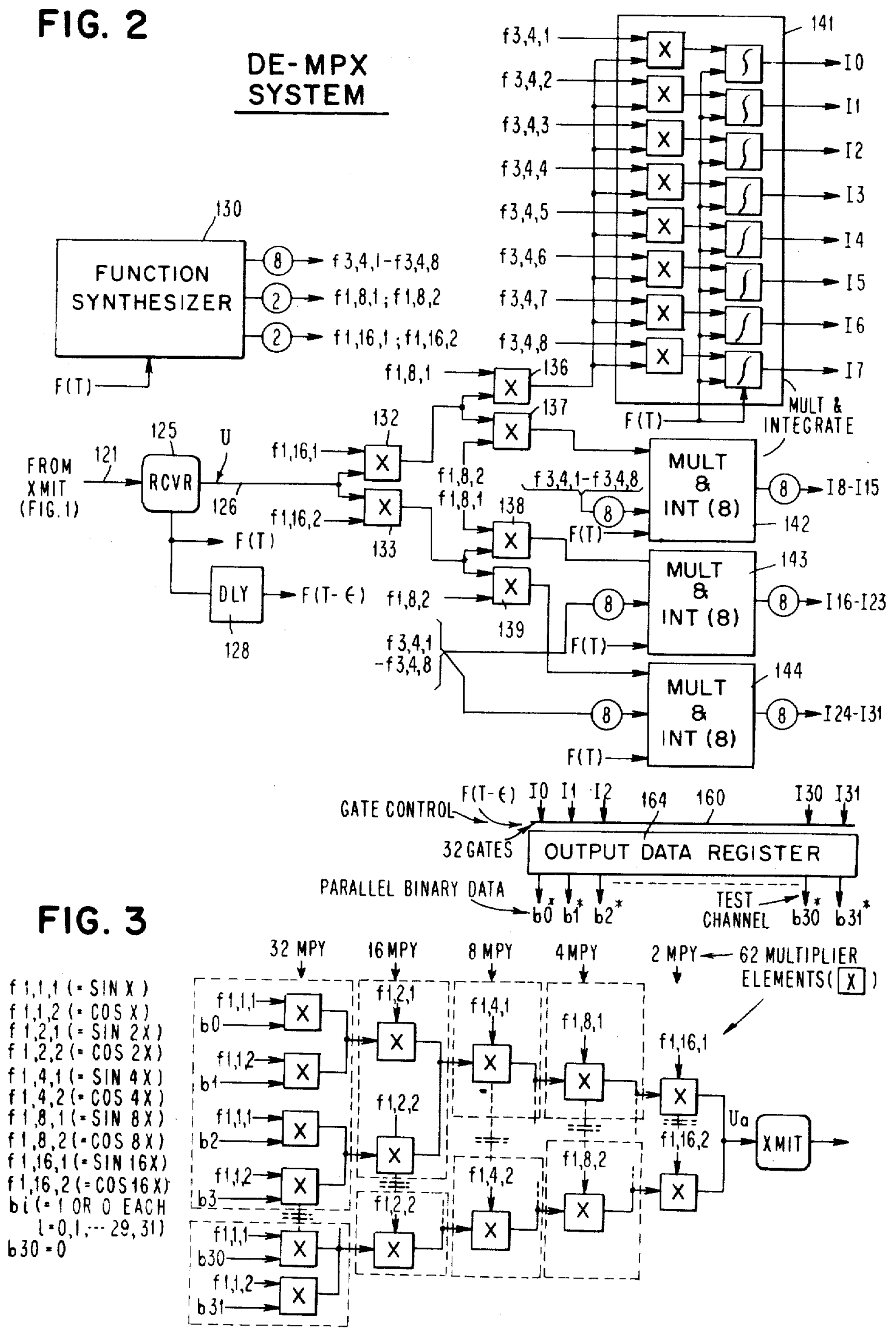
FIG. 3 illustrates schematically a variation of the transmitter arrangement shown in FIG. 1. The additional multiplication elements in this arrangement may be offset by the increased modularity and flexibility resulting from the use of smaller selection groupings in the first level selection. The particular functions participating in the first level of composition in this arrangement are noteworthy inasmuch as each is a degenerate product function having only a single sine or cosine factor.
Figures 4, 5, 6, 7, 8:
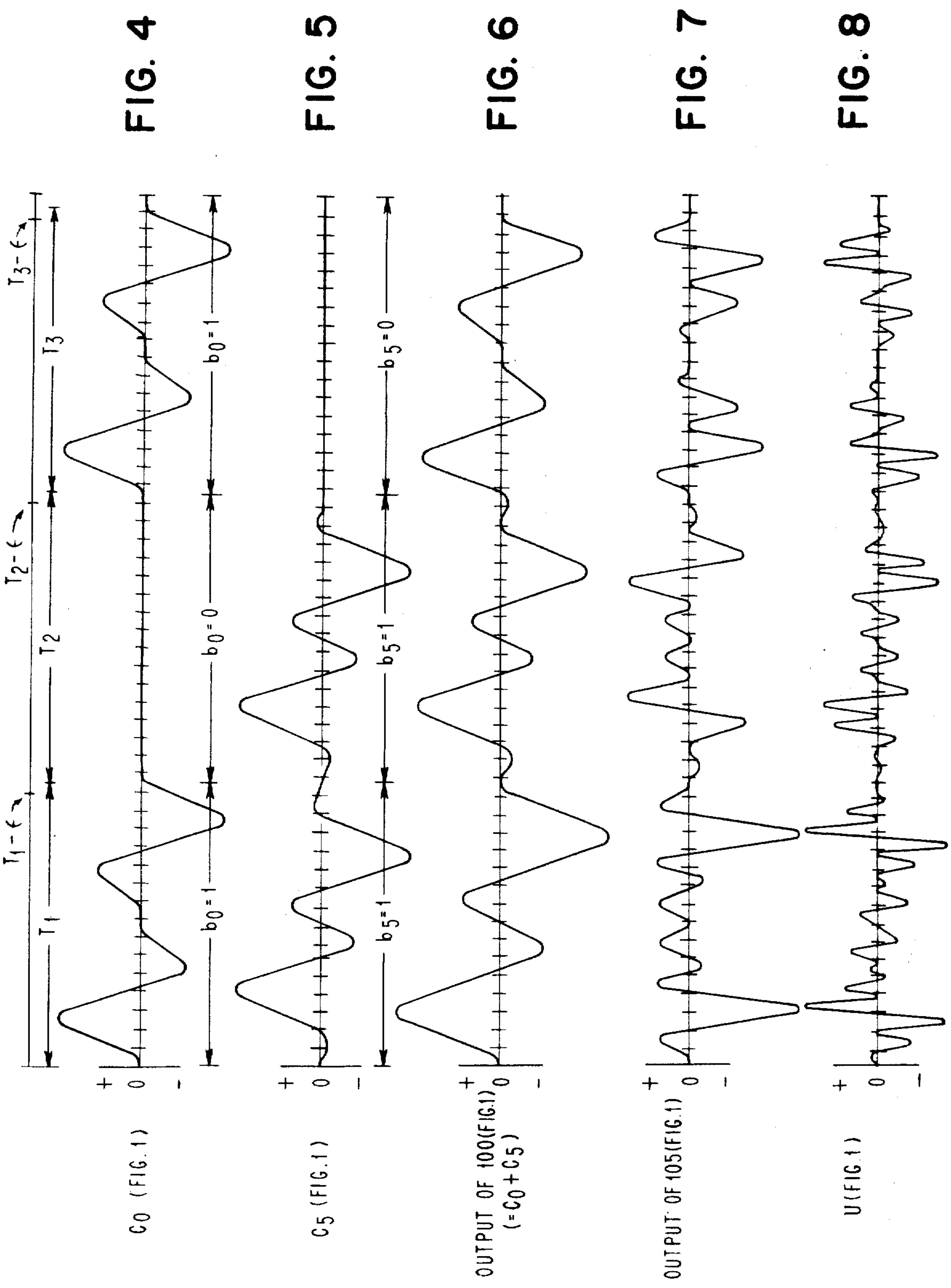
FIGS. 4–12 are signal diagrams illustrating signal waveforms obtained at specific stages of the apparatus shown in FIGS. 1 and 2, over three successive half-cycles of the fundamental frequency $f_o$; assuming a particular sequence of digital input states in each of the 31 parallel binary input channels.
Figure 9:
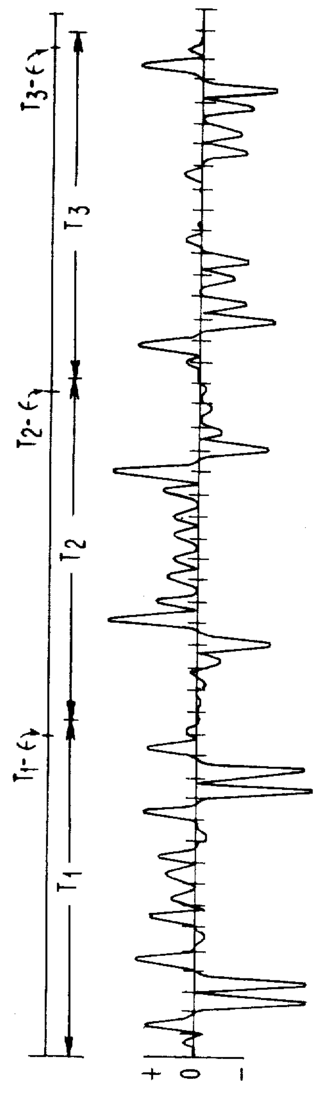
Figure 10:
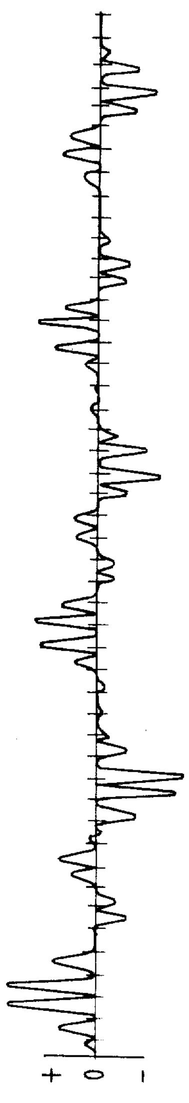
Figure 11:
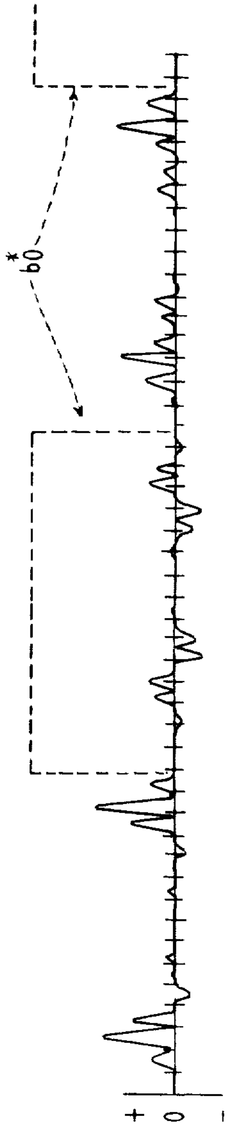
Figure 12:
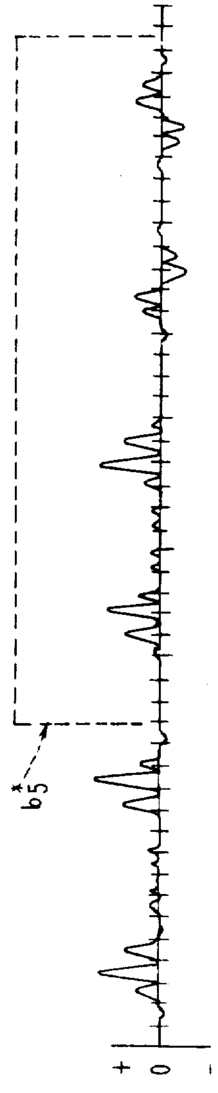

A preferred embodiment of the invention is illustrated in FIGS. 1 and 2. The transmission (up-converter) section is shown in FIG. 1 and the receiving apparatus (down-converter) section is shown in FIG. 2. FIGS. 4–12 are waveform timing diagrams illustrative of the waveforms obtained at various terminals of the apparatus indicated in FIGS. 1 and 2.

The preferred embodiment is illustrated for the example of a system capable of carrying up to 31 binary channels of information in the superposed elements of each fundamental interval of composite transmission. Extension of this to larger systems (63 channel capacity, etc.) will be apparent as the description proceeds. For reasons which will become apparent one of the 32 available channels is maintained permanently in a quiescent (zero state) and is treated on the receiving end as a "dummy" or test channel.

In this embodiment 10 primitive sine and cosine functions (sin $nX$, cos $nX$; $n$=1,2,4,8,16) are utilized to compose all transmission waveforms. Six of these functions (sin $nX$, cos $nX$; $n$=1,2,4) are permutatively multiplied to synthesize a first set of eight product functions $f_{3,4,i}$($i$=1,2, . . . ,8) of order 3 and class 4. The other four single factor functions ($f_{1,8,1}$, $f_{1,8,2}$, $f_{1,16,1}$ and $f_{1,16,2}$) represent second and third relatively disjoint two-member sets ($f_{1,8,1}$ and $f_{1,8,2}$ in the second set; $f_{1,16,1}$ and $f_{1,16,2}$ in the third set) which are each disjoint relative to the eight member first set above.

The high order complex transmission waveform is constructed in two converging stages of modularly grouped multiplications by members of the second and third sets alternating with linear superpositions, which follow a first stage of grouped selections of members of the first set by multiple sets of binary signals. The receiving apparatus contains an inversely symmetric arrangement of two stages of divergently cascaded multiplications by members of the second and third sets terminating with a last stage of multiple multiplications by members of the first set and integration of resulting functions over half-periods of $f_0$.

The transmitting station (FIG. 1) contains a basic timing and function synthesizing unit 10 for synthesizing the above-mentioned three disjoint sets of product functions and timing signals $F(T)$ which are pulses coinciding with odd multiples of $T_0=\frac{1}{4}f_0$ (i.e. times corresponding to odd multiples of the phase $X=X_0=\pi/2$). Timing and synthesis units of this type are fully described in the said Filipowsky patent.

It is easily verified that the functions in each set are relatively orthogonal to other functions of the same set although not to functions of the other sets.

Binary signal bus 12 consisting of 32 parallel signal lines couples to a 32 stage data register 14 through 32 respective gates indicated generally at 16. The gates 16 are enabled simultaneously by each timing pulse $F(T)$. The output of the data register therefore consists of 32 parallel binary signal channels containing signals varying or recurring at the rate of $F(T)$. These 32 outputs, denoted $b_j (j=0,1, \ldots ,31)$, are utilized as the basic selection signals in the first stage of construction of the transmission composite.

The first stage of transmission composite construction contains 32 multiplication elements (denoted by the symbol "X" enclosed in a rectangle) grouped in four sections 100, 101, 102 and 103. Each first stage section 100–103 contains eight multiplication elements individually connected to receive respective functions $f_{3,4,i} (i=1,2, \ldots ,8)$ of order 3, class 4 comprising the first disjoint set of functions supplied by the synthesizer 10. It will be understood that the arrangement indicated in detail for section 100 is repeated identically for section 101, 102 and 103 with respect to the functions $f_{3,4,i}$. The multiplication elements of the first section 100 are also individually connected to a first group of eight outputs $b_0$–$b_7$ of the register 14 representing a set of parallel data to be encoded for transmission. The second section 101 contains a similar arrangement of connections of the individual multiplication elements to a second group $b_8$–$b_{15}$ of outputs of the register 14. The third section contains a similar arrangement of connections to a third group of outputs $b_{16}$–$b_{23}$ of register 14. The fourth section 103 similarly contains individual multiplication connections to a fourth group of outputs $b_{24}$–$b_{31}$ of register 14.

Since the binary signals $b_0$–$b_{31}$ have constant binary 1 and 0 conditions between sampling instants $F(T)$ they act as constant multipliers for the respective 32 multiplication elements in the four sections 100–103. Consequently in these sections the multiplication elements are simply gates providing unity gain transferrance of the function waveforms $f_{3,4}$ which are gated by signals $b_j$ having binary 1 condition. Function waveform channels associated with signals $b_j$ having binary 0 condition are inhibited.

In each section 100–103 the subset of function waveforms (of the set $f_{3,4,i}$) selected by respective binary one outputs of the register 14 are superposed by linear addition to form a composite signal associated with the selected subset. In order to maintain output power levels at the summing junctures it may be desirable to provide active linear summing networks at these junctures.

In the second stage of transmission composition the composite sum waveforms produced by sections 100–103 are coupled respectively to analog multiplication elements 105–108. These are fed alternately by the single factor multiplier functions of order 1 class 8, $f_{1,8,1}$ and $f_{1,8,2}'$ of the second disjoint set supplied by synthesizer unit 10. Outputs of elements 105–108 are waveforms corresponding to products of respective sum composite inputs and class 8 multiplier function inputs.

Outputs of multiplication elements 105 and 106 are superposed by linear addition and the sum composite is connected to input of a third stage analog multiplication element 112 having a second input connection to the order 1 class 16 function $f_{1,16,1}$ of the third disjoint set supplied by synthesizer 10. Similarly the outputs of elements 107 and 108 are superposed by linear addition and the associated sum composite is input to third stage analog multiplication element 113 for multiplication by function $f_{1,16,2}$ of the third disjoint set. Outputs of elements 112 and 113 are superposed by linear addition to form the transmission function U. Function U is processed through transmission network 120 to provide a corresponding transmission signal to the transmission medium 121. Network 120 may, for instance, adjust the amplitude of the transmission function input or even utilize the said input to modulate a carrier signal in accordance with conventional transmission practices not relevant to the present discussion of operation of the subject system.

RECEIVING STATION (FIG. 2)

At the receiving end the envelope of the composite signal in the transmission channel 121 is processed through receiving network 125 to transfer signals to output line 126 which correspond to the signals U handled by network 120 (FIG. 1). The receiving network 125 also contains circuits, as described by Filipowsky, for extracting from the received transmissions timing signals corresponding to $F(T)$ which are required for local synchronization and sampling functions. Delay network 128 coupled to the timing signal output of the receiving network delays the basic extracted pulse function $F(T\text{-}\epsilon)$ which lead respective next timing pulses $F(T)$ by small intervals $\epsilon$.

Synthesizer unit 130 maintained in phase-locked synchronization with synthesizer unit 10 (FIG. 1) of the transmitting station reproduces the three disjoint function waveform sets of classes 4, 8 and 16 utilized in construction of the transmission function U. The signal function on line 126 is applied to analog multiplication elements 132 and 133 in a first stage of reception "decomposition" for multiplication by respective locally synthesized functions $f_{1,16,1}$ and $f_{1,16,2}$ (i.e. sin16X and cos16X).

First stage complex product function outputs are coupled individually to pairs of analog multiplication elements in a second stage of multiplication. Output of element 132 is coupled to second stage multiplication elements 136 and 137 for multiplication by functions $f_{1,8,1}$ and $f_{1,8,2}$ respectively. Output of element 133 is coupled to second stage multiplication elements 138 and 139 for multiplication by $f_{1,8,1}$ and $f_{1,8,2}$ respectively.

The four second stage outputs are connected separately as inputs to four respective multiplication and integration sections 141–144, each containing eight separate stages of cascaded analog multiplication and integration elements. As an example, multiplication and integration section 141 is shown receiving the output of multiplication element 136 for discrete multiplication by each of the eight locally synthesized functions $f_{3,4,i}(i=1,2,\ldots,8)$ of order 3 and class 4. Sections 142–144 will be understood to contain identical arrangements of cascaded multiplication and integration elements for multiplying outputs of respective elements 137–139 by $f_{3,4,i}$.

The integration elements in the sections 141–144 are reset in coordination with the timing signals $F(T)$ and are thereby operative to integrate respectively received functions over intervals of the function X between odd multiples of $\pi/2$ (i.e. between $-\pi/2$ and $+\pi/2$ and between $+\pi/2$ and $-\pi/2$). Outputs $I_0$–$I_{31}$ of respective integrating elements of the sections 141–144 are sampled by F(T-ε) through gates 160 slightly in advance of the integrator resetting function $F(T)$. The sampled signals which are shown below to have binary conditions are placed in the 32 bit buffer register 164 having outputs designated $b_0^*$–$b_{31}^*$. It will be shown that these outputs, assuming proper operation of the foregoing communication system, will correspond identically to respective signals $b_0$–$b_{31}$ received in the buffer register 14 at the receiving station.

PRINCIPLES OF OPERATION

It will be observed that all but one of the functions $f_{3,4,i}(i=1,\ldots,8)$ of order 3 and class 4 have zero values at terminal phases: $X=+\pi/2$, $-\pi/2$ of the sampling intervals. The exception is $f_{3,4,7}$ having values of $-1$ and $=1$ at these instants. Since first order, first rank functions of class 8 and 16 also have zero values at these times (i.e. at $X$=odd multiples of $\pi/2$) it will be understood that all composite signal components handled through the multiplication elements 112 and 107 in FIG. 1 will pass smoothly through zero at ends of sampling intervals. Clearly then, when $b_{30}$ has zero value (i.e. when the gate for $f_{3,4,7}$ in section 103 is disabled) the composite output of section 103, and therefore the final composite U, will have smooth zero transitions between sampling intervals regardless of the state of the other binary selection functions $b_0,\ldots,b_{29}$ and $b_{31}$.

Accordingly, since it is preferred for transmission efficiency to maintain smooth zero transitions in U, we prefer to set the gating level of $b_{30}$ constantly at zero, and to dispense with usage of $b_{30}$ as a data signal channel. However it is deemed neither necessary nor desirable to eliminate the multiplication element in transmission station section 103 which is associated with the binary signal $b_{30}$ or the multiplication and integrating elements in the receiving station section 144 associated with the signals $I_{30}$ and $b_{30}^*$ which will be shown later to correspond in state to $b_{30}$. These elements have utility as a test channel to test for zero condition of composite reception under dynamic conditions and to check reception timing extraction functions.

Signal $b_{30}$ may be held in a zero state either through appropriate input gate conditioning of the corresponding stage of the register 14 or by elimination of this register stage and replacement of its output by a constant zero signal. Hereafter the elements of transmitting station section 103 associated with $b_{30}^*$ and the elements of the receiving station associated with $b_{30}^*$ will be referred to either as the "dummy" channel or the test channel. An additional benefit of the retention of this channel is the preservation of symmetry and modularity of construction of the transmitting station sections 100–103 and the receiving station sections 141–144.

The composite function U is defined by:

(2)

$$U(X)=(f_{1,16,1})(f_{1,8,1})\sum_{1}^{8}(b_{i-1})(f_{3,4,i})+$$
$$+(f_{1,16,1})(f_{1,8,2})\sum_{1}^{8}(b_{i+7})(f_{3,4,i})+$$
$$+(f_{1,16,2})(f_{1,8,1})\sum_{1}^{8}(b_{i+15})(f_{3,4,i})+$$
$$+(f_{1,16,2})(f_{1,8,2})\sum_{1}^{8}(b_{i+23})(f_{3,4,i})$$

where $X=w_0t$

By rearrangement of the factors of each sum term in expression 2 above we have:

(3)

$$U(X)=\sum_{1}^{8}(b_{i-1})(f_{3,4,i})(f_{1,8,1})(f_{1,16,1})+$$
$$+\sum_{1}^{8}(b_{i+7})(f_{3,4,i})(f_{1,8,2})(f_{1,16,1})+$$
$$+\sum_{1}^{8}(b_{i+15})(f_{3,4,i})(f_{1,8,1})(f_{1,16,2})+$$
$$+\sum_{1}^{8}(b_{i+23})(f_{3,4,i})(f_{1,8,2})(f_{1,16,2})$$

In the expanded summation each term in expression (3) above would contain a five factor product of three functions having respective classes: 4, 8 and 16; and respective orders 3, 1 and 1. From the definitions in the Filipowsky patent disclosure it will be appreciated that such five factor products constitute fifth order trigonometric product functions of class 16. By inspection it is seen that the fifth order functions in consecutive terms of expression (3) have consecutive rank. Consequently expression (3) can be written more compactly in the form:

(4) $$U(X)=\sum_{i=0}^{31} b_i f_{5,16,q_0+i}$$

Wherein $q_0$ represents the rank of the fifth order function which is multiplied by $b_0$.

At the receiving end the integrands received by the 32 integrating elements of sections 141–144 have respective form:

(5) Integrands:

$(f_{3,4,1})(f_{1,8,1})(f_{1,16,1})(U)$

.

.

.

$(f_{3,4,8})(f_{1,8,1})(f_{1,16,1})(U)$ $(f_{3,4,1})(f_{1,8,2})(f_{1,16,1})(U)$

.

.

.

$(f_{3,4,8})(f_{1,8,2})(f_{1,16,1})(U)$ $(f_{94\,3,4,1})(f_{1,8,1})(f_{1,16,2})(U)$

.

.

.

$(f_{3,4,8})(f_{1,8,1})(f_{1,16,2})(U)$ $(f_{3,4,1})(f_{1,8,2})(f_{1,16,2})(U)$

.

.

.

$(f_{3,4,8})(f_{1,8,2})(f_{1,16,2})(U)$

This can be written more compactly:

(6) $(f_{5,16,q_0+j})(U)$ [32 consecutive expressions; $j=0,1,\ldots,31$]. Substituting the value of U given by (4) above each expression (6) becomes:

(7) $$\sum_{i=0}^{31} b_i (f_{5,16,q_0+i})(f_{5,16,q_0+j})$$

[one 32 term sum for each $j=0, 1, \ldots, 31$]

therefore, (8)

$$b_j^*(j=0, 1, \ldots, 31) = \int_{-\pi/2}^{\pi/2} \left[ \sum_{i=0}^{31} (b_i)(f_{5,16,q_0+i})(f_{5,16,q_0+j})\,dX \right]$$

where $dX = w_0 dt$ since an integral of a sum equates to a sum of integrals this can be written as:

(9)

$$b_j^*(j=0, 1, \ldots, 31) = \sum_{i=0}^{31} b_i \left[ \int_{-\pi/2}^{\pi/2} (f_{5,16,q_0+i})(f_{5,16,q_0+j})\,dX \right]$$

which is seen to comprise a sum of 32 integration terms, for each integration operation, with each term consisting of a product of two fifth order class 16 functions of relative rank: $i,j$. By reference to the Filipowsky patent disclosure above it is seen further that the set of all such functions of order 5 and class 16, which are formed by taking products of sine and cosine functions of the first, second, fourth, eighth and 16 harmonics of the fundamental frequency $f_0$, comprise an orthogonal set. It is further seen that in each term of expression (9), with the exception of the $j$th term, the paired factor functions are different from each other and therefore the integral is "zero." In the $j$th term of each ($j$th) expression the factor functions are identical and the integral of such terms would be "one." Accordingly, taking into consideration the orthogonality of such functions it is seen that:

(10) $b_j^*(j=0,1,\ldots,31)=b_j$

Accordingly it is now seen that there is one to one correspondence between the binary selection signals supplied in parallel by register 14 at the transmitting station and the binary sample conditions gated into output register 164 from the integration sections 141–144 in the receiving station. Therefore it is seen that the foregoing system comprises a communication system for parallel conveyance of up to 32 channels of binary information.

As mentioned previously it is preferred that the 30th channel associated with $b_{30}^*$ be utilized as a dummy or test channel with $b_{30}^*$ established at a constant zero level. Consequently, since $b_{30}^* = b_{30}$ assuming proper system functioning, it may now be appreciated that the output line associated with $b_{30}^*$ in register 164 may be used as a constant zero test terminal for detecting the presence of unusually high noise or distortion levels in the system during dynamic operation of the system. Furthermore, with this arrangement, U is a completely smooth function ($U(X_0)=0$ where $X_0=+\pi/2$ or $-\pi/2$), for all possible states of the composite function $U$.

FIGS. 4–12 represent signal waveforms at indicated stages of the transmitting and receiving apparatus over three consecutive transmission periods $T_1,T_2,T_3$ during which selection conditions $b_j$ are as follows:

(11)

$b_0=1,0,1$ $b_5=1,1,0$ $b_j=0,0,0 (j\neq 0 \text{ or } 5)$

Observe the correspondence:

$b_0^*=1$ (after $T_1-\epsilon$, 0 (after $T_2-\epsilon$), 1 (after $T_3-\epsilon$)

$b_5^*=1$ (after $T_1-\epsilon$), 1 (after $T_2-\epsilon$), 0 (after $T_3-\epsilon$).

It will be understood that the not shown channels $b_j^*$ ($j \neq 0,5$) have continuous zero conditions from $T_1-\epsilon$ through the period beginning at $T_3-\epsilon$.

ALTERNATE EMBODIMENT (FIG. 3)

Referring to FIG. 3 an alternate embodiment of the transmitting station based upon the synthesis of only primitive single factor sine and cosine functions is illustrated. In the first section the transmitting station contains 32 selection gates (MPY) controlled by 32 binary signals ($b_0, \ldots, b_{31}$; with a dummy channel in $b_{30}$). These gates alternatively receive as analog function inputs the functions sineX and cosineX ($f_{1,1,1}$ and $f_{1,1,2}$). In the second stage of composite formation 16 multiplication elements (MPY) each receive the sum composite output of a respective consecutive pair of selection gates of the first stage and a class 2 function (sine2X or cosine2X as multiplier). The class 2 functions are also connected in the second section in an alternating sequence (first sine2X and then cosine2X and so on). Eight multiplication elements in the third section multiply sums of pairs of second stage outputs by class 4 functions (alternately sine4X, cosine4X). Four multiplication elements in the fourth stage multiply respective summed pairs of previous stage outputs by class 8 functions (sin8X, cos8X). Finally two fifth stage elements multiply summed pairs of fourth stage outputs by class 16 functions (sin16X, cos16X).

Where the embodiment of FIGS. 1, 2 utilizes 46 multiplication elements (8 in the synthesizer 10, 32 in sections 100–103 and six in the two last stages), the alternate embodiment requires 62 such elements. This disadvantage is partially offset by the additional modularity and flexibility.

The composite function $U_a$ like the function U discussed previously, is a sum of fifth order class 16 product functions $f_{5,16,q_0+i}$ ($i$=0, . . . ,31) corresponding to products of sine and cosine functions of X,2X,4X,8 X and 16X. Hence integrand functions at the receiving station are sums of products of such fifth order functions, with a unique matched product term in each sum corresponding to the positional rank of the respective integrand. Hence again we would have $b_j^*=b_j$ ($j$=0,1, . . . ,31).

FREQUENCY SYNTHESIS, MULTIPLICATION AND TIMING CONSIDERATIONS

All elements in this system are well known and have been extensively described in the prior art. The waveform generators can consist of oscillators, gates and multiplier circuits, which synthesize the waveform sets utilized for binary selection and multiplication. This technique is well known from analog computer and signal simulator technology and is particularly easy to apply in this system as all waveforms are harmonically related. In the present system all oscillators are phase-locked to one master timer and each must have sine and cosine phase outputs. There will be at least one multiplier required for each initially synthesized product waveform; e.g. $f_{3,4,i}$.

The details of construction of a frequency synthesizer of the type described would be readily apparent to one skilled in the art. For instance, a set of phase-locked oscillators could be used as described in Chapter 2 of "Radio Transmitters," by Lawrence Gray and Richard Graham (McGraw-Hill, New York, 1961). Another pertinent reference in the frequency synthesis art is "A Survey of Frequency Synthesis Techniques," Milton Baltas, Army Electronics Research and Development Lab., Fort Monmouth, N.J., September 1962 (USAERDL Technical Report No. 2271).

The multiplication elements in the advanced stages of composite formation (i.e. elements other than those in the selection sections 100–103 of FIG. 1) are product modulators of a conventional type known to those skilled in the art. In analog computers it is common practice to use time division multipliers for highest accuracy. (See for example: E. Kettel and W. Schneider: An Accurate Analog Multiplier and Divider; IRE Transactions on Electronic Computers, vol. EC 10, June 1961, pp. 269–272, and references therein to older literature.) Such devices are product modulators which can be used in those applications of the invention where highest accuracy of the product waveforms will be required to avoid intersymbol crosstalk. For less critical applications balanced modulators will be useful. (See for example: W. P. Birkemeier and G. R. Cooper: The Balanced Modulator As a Correlator for Random Signals; IRE Transactions Circuit Theory, vol. CT 9, December 1962, pp. 417–419.) Such modulators act as multipliers and produce suppressed carrier amplitude modulation. They have recently been designed with tunnel diodes as non-linear elements. (See: B. Rabinovici, T. Klapper and S. Kallus: Suppressed Carrier Modulations with Tunnel Diodes; Communications and Electronics, vol. 81, July 1962, No. 61, pp. 205–209.) For low frequency applications rectifier modulators are preferably (see D. P. Howson: Rectifier Modulators, Analysis by Successive Approximations, Electronic Technology, vol. 37, April 1960, pp.158–162. See also: D. P. Howson and D. G. Tucker: Rectifier Modulators with Frequency-Selective Terminations; Proc. Instn. El. Engrs., Part B, vol. 107, May 1960, No. 33, pp. 261–272.)

At the receiving end synthesis of waveforms can be accomplished in much the same manner as in the transmitting apparatus. The waveforms must all be phase-locked to the master timing signals of the transmitting apparatus. For this purpose timing information may be extracted from the received composite U by extraction circuits of a type well known in the art. For example, the composite extractor might comprise a full-wave rectifier for detecting the deep notches occurring in the envelope of the composite waveform between transmission intervals. This is due to the fact that all composite waveforms start and end at zero levels with regular periodicity. The repetition rate of these occurrences can be extracted with a flywheel synchronization circuit of the type used in television receivers.

The presence of such notches may be expressed more markedly by the insertion of short synchronization gaps between successive intelligence transmission intervals. If amplitude modulation of a carrier signal is contemplated, the carrier may be keyed to zero level during the synchronization gaps, while care may be taken that negative peaks of the composite waveform never reach below the zero carrier level. This system gives clear synchronization pulses after envelope detection which may be easily separated from the product waveforms by simple clipper circuits. This method is the well known synchronization pulse separation method of conventional television broadcasting methods. (See for example: A. V. T. Martin, Technical Television, Prentice Hall, 1962, or S. W. Amos and D. C. Birkinshaw, Television Engineering, Principles and Practice; Iliffe Books Ltd., London, 1962.)

Integrand waveform levels in the receiving apparatus may be adjusted at installation, by techniques well known in the art, to provide for a discrete unity range of variation in the output of each integration channel as required for accurate binary selection of the levels $b_0^*$-$b_{31}^*$. Threshold circuit devices of a type well known in the art may be utilized in the gating paths between integration outputs and respective inputs of register 164 (FIG. 2).

ALGORITHMS FOR SYSTEM CONFIGURATION

For efficient bandwidth usage, a preferred algorithm for selection of the analog waveform parameters for up-conversion is as follows:

Definitions

Let $N$ = number of channels transmitted

Let $[N-1]$ = number of data bits simultaneously transmitted

Let $j$ be the number of stages desired in the up-conversion process

Let $q$ be the number of trigonometric product functions in the basic first stage selection set where $q = N/2^j$ Let $p$ be the number of factors in each function in the basic first stage set of trigonometric product functions where $p = \log_2 q$ Let $K$ be the highest harmonic in the basic group where $K=2^{(p-1)}$

EXAMPLES

For $N = 64$
Let $j = 3$
then
$q = N/2^j = N/2^3 = 64/8 = 8$
and
for $q = 8$
where $2^p = q$
then $p = 3$
and, then,
$k = 2^{(p-1)} = 2^2 = 4$
$f_{p,k,q} = (f_{3,4,1}, \ldots f_{3,4,8})$ $N = 32$
Let $j = 2$
then
$q = N/2^j = 32/2^2 = 8$
and
for $q = 8$
where $2^p = q$
then $p = 3$
and, then,
$k = 2^{(p-1)} = 2^2 = 4$
$f_{p,K,q} = (f_{3,4,1}, \ldots f_{3,4,8})$ The functions utilized as multipliers in the first stage of up-conversion consist of the set:

$(f_{1,2K,1}, f_{1,2K,2})$

The functions utilized as multipliers in the second stage of conversion consist of the set:

$(f_{1,4K,1}, f_{1,4K,2},$

The $n$th level up-converter functions consist of the the set:

$(f_{1,2^nK,1}, f_{1,2^nK,2})$ for $n=1, 2, 3, \ldots j$.

Obviously products of plural single-factor functions can be utilized as second and higher stage multipliers. The key point to note in this is that the end object is to construct a distinct composite U which is representative of a sum of distinct trigonometric product waveforms of high order and class, after indistinct selection of product waveforms of lower order and class, and in reception decomposition to combine such composites multiplicatively, in multiple channels, with associated waveforms to construct integrand functions which are sums of products of high order product waveforms of one orthogonal set each sum containing a unique matching term.

With these considerations understood other embodiments of this invention will be apparent to those skilled in the art. The spectral distribution of the transmission composite may be enlarged by utilizing higher harmonics of the fundamental frequency in the multiplier functions. The data channel capacity may be enlarged by duplicating the composition circuitry and adding an extra final stage of multiplication and summation. In the latter instance it will be seen that the function in one data channel will not have smooth zero transitions at integration limits and should be treated as a dummy (constant zero) channel by suppression of the input gate as discussed above.

We have shown and described above the fundamental novel features of the invention as applied to several preferred embodiments. It will be understood that various omissions, substitutions and changes in form and detail of the invention as described herein may be made by those skilled in the art without departing from the true spirit and scope of the invention. It is the intention therefore to be limited only by the scope of the following claims.

What is claimed is:

1. A multiplex signalling system comprising: periodically a first source of multiple smooth signal waveforms representing members of at least two disjoint sets of products of harmonically related trigonometric functions; each product function in each said disjoint set having orthogonal relation to every other product function in the same set;

a second source of multiple sets of periodically recurrent parallel binary input pulse signals having periodicity related to the period of the fundamental frequency of said trigonometric functions;

means for effecting multiple selections of product function waveform members of one of said sets simultaneously, in multiple parallel subsets, in accordance with respective said sets of binary pulse input signals;

means for combining the selected product function waveforms in each selected subset by linear addition into a composite waveform associated with the subset; 1 means for continuously multiplying said composite subset-associated waveforms by waveform members of another one of said disjoint sets means coupled to said multiplying means for producing a single distinct complex signal of smooth form which is functionally related to all of the component waveforms of all composite waveforms received by said multiplying means;

a transmission medium;

means for transmitting said complex signal over said medium;

means for receiving said complex signal; and means coupled to said receiving means for deriving from said complex signal multiple sets of parallel binary output pulse signals corresponding to said binary input pulse signals.

2. A system according to claim 1 wherein said means coupled to said receiving means includes:

a third source of multiple smooth signal waveforms corresponding to said product functions supplied by said first source;

means for maintaining synchronism between respective member waveforms of said first and third sources;

means for multiplying waveforms supplied by said third source by said complex signal and by products of said complex signal and other said waveforms in a diverging network of multiplying circuits;

means for recurrently integrating and sampling signals issuing in parallel from said multiplication network, over half-periods of the fundamental frequency common to all member waveforms supplied by said first and third sources, to obtain thereby said corresponding binary output pulse signals.

3. For a communication system including a multiplex signal transmitter, a multiplex signal communication channel and a multiplex signal receiver, an improved transmitter comprising:

a first source of plural disjoint sets of harmonically related smooth trigonometric product function signals;

a second source of multiple sets of periodically recurrent binary input pulse signals having parallel form and having recurrence periodicity related to half-cycle periods of the fundamental frequency associated with said disjoint sets of product functions;

means for effecting recurrent selections of multiple subsets of member product function signals of one of said disjoint sets simultaneously in parallel in accordance with instantaneous states of respective signals in said sets of binary input signals; and means coupled to receive signal outputs of said selection effecting means together with signals from said first source representing members of a said disjoint set other than said one set, said coupled means being operative to produce a composite waveform of smooth outline, which is functionally related to each of said received signals, by a convergent series of linear addition and multiplication operations performed upon said received signals; and means for coupling a signal associated with said composite waveform to said communication channel as a transmission signal.

4. For a communication system in accordance with claim 3 an improved receiver comprising:

a third source of plural disjoint sets of trigonometric product function signals corresponding to and synchronous with the signals of said first source;

means coupled to receive said transmission signal and said product function signals of said third source and to produce therefrom, in parallel, multiple sets of smooth ultra-complex signals associated with respective said sets of binary input signals;

multiple sets of integrating means coupled to receive respective said ultra-complex signals in parallel and to effect simultaneous integrations thereof periodically in periods corresponding to successive half cycle intervals of the fundamental frequency associated with said product function signals of said first and third sources; and means coupled to said integrating means and operative to sample and store outputs thereof at terminal instants of said integration periods; said sampled outputs having binary significance corresponding to states of said binary input signals.

5. For a communication system including a complex signal transmitter, a complex signal communication channel and a complex signal receiver, an improved transmitter comprising:

a first source of plural signals representing member functions of plural disjoint sets of harmonically related smooth trigonometric product functions having form:

$f_{p,k,q}(t)=A\sin(S_1 w_0 t+r_1\pi/2)\sin(2s_2 w_0 t+r_2\pi AB$
$2)\sin Ks_{33\,K} w_0 t+r_K\pi/2)$ wherein:

each $s_i(i=1,\ldots,K)=0$ or 1 each $r_i(i=1,\ldots,K)=0$ or 1

$p$ designates the "order" of the function and represents the number of non-trivial sine and cosine factors in $f$.

$K$ designates the "class" of the function and represents the highest harmonic in any factor of $f$.

$q$ designates the rank of the function relative to all functions of the same order $p$ and class $K$;

a second source of multiple sets of periodically recurrent binary input pulse signals having parallel form and having recurrence periodicity related to half-cycle periods of the fundamental frequency associated with said disjoint sets of product functions;

means for effecting recurrent selections of multiple subsets of member function signals of one of said disjoint sets simultaneously in parallel in accordance with instantaneous states of respective signals in said sets of binary input signals; and means coupled to receive outputs of said selection effecting means together with outputs of said first source representing members of a said disjoint set other than said one set, said coupled means being operative to produce a composite transmission signal of smooth outline by a convergent series of linear addition and multiplication operations performed upon said outputs of said selection effecting means, wherein each of said received outputs is represented as a distinguishable component;

means for coupling said transmission signal to said communication channel.

6. In a communication system including a transmitter according to claim 5 an improved receiver comprising:

a third source of plural disjoint sets of signals corresponding to the signals produced by said first source;

multiple sets of integrator elements;

means coupled to receive said transmission signal and the signals produced by said third source and responsive thereto to supply to said integrator elements as inputs uniquely distinguishable integrand function signals having the form:

$[f^*_{p,K,q_i}(t)][U(t)]$, where: $i$ is an integer varying over a range consisting of one unique value for each respective integrator input; $p$,$K$ and $q_i$ are integers denoting order, class and rank properties of respective functions $f$; functions $f^*_{p,K,q_i}(t)$ for all values of $i$ comprise an orthogonal set; and $U(t)$ has the form:

$$U(t)=\sum_{\text{all } j} f^*_{p,K,q_j}(t)$$

where $j$ is an integer variable having the same range of variation as $i$;

and means coupled to said integrator elements to operate said elements in parallel to produce as outputs discrete parallel binary signals $b_i$* each corresponding to a different one of said binary input signals produced by said second source.

7. A communication system according to claim 6 wherein said integrator element operating means controls integration of said integrand signals over intervals corresponding to said half-cycle periods of said fundamental frequency.

8. A communication system according to claim 5 wherein all but one of the signals $f_{v,x,q}(t)$ in said one of said disjoint sets have smooth zero points at ends of said half-cycle periods and a binary input signal associated with selection of said one signal is conditioned to have a constant value inhibiting selection of said one signal for producing said transmission signal with an envelope which is invariably smooth at said ends of said half-cycle periods.

9. A system according to claim 8 in which elements of the system participating in the encoding and decoding of said binary input signal associated with selection of said one signal are utilized as a permanent test channel.

* * * * *

PO-1050
(5/69)

UNITED STATES PATENT OFFICE
CERTIFICATE OF CORRECTION

Patent No. 3,697,697 Dated October 10, 1972

Inventor(s) Leo M. Audretsch, Jr., Matthew Elsner

It is certified that error appears in the above-identified patent and that said Letters Patent are hereby corrected as shown below:

Column 14, lines 11 and 12, delete the word "periodically". Column 15, lines 65 and 66, delete "AB" (line 65); the formula should read --/2)sinKs$_K$w$_0$t+r$_K$π/2)--. Column 16, line 2, after the word "each" the formula should read --s$_i$(i=1,...,K)=0 or 1--. Column 16, line 46, after the word "a" insert the word --limited--. Column 16, line 49, after the letter "f" insert an --*--.

Signed and sealed this 29th day of May 1973.

(SEAL)
Attest:

EDWARD M.FLETCHER,JR.
Attesting Officer

ROBERT GOTTSCHALK
Commissioner of Patents